United States Patent [19]

Talmor

[11] Patent Number: 4,828,768
[45] Date of Patent: May 9, 1989

[54] JET SCRUBBER AND METHOD OF OPERATION

[75] Inventor: Eli Talmor, Concord, Calif.

[73] Assignee: Chevron Research Company, San Francisco, Calif.

[21] Appl. No.: 502,932

[22] Filed: Jun. 10, 1983

[51] Int. Cl.$^4$ ............................................. B01D 47/10
[52] U.S. Cl. ........................................ 261/116; 55/73; 55/84; 55/223; 55/238; 261/118; 261/DIG. 54; 261/DIG. 75; 423/242; 423/573.1
[58] Field of Search ............... 261/116, 118, DIG. 54, 261/76, DIG. 75; 55/223, 90, 73, 84, 238; 423/573 R, 242

[56] References Cited

U.S. PATENT DOCUMENTS

| | | | |
|---|---|---|---|
| 2,579,282 | 12/1951 | Vicard | 261/DIG. 54 |
| 3,014,705 | 12/1961 | Colucci | 261/DIG. 54 |
| 3,097,926 | 7/1963 | Nicklin et al. | 423/573 R |
| 3,212,235 | 10/1965 | Markant | 261/DIG. 54 |
| 3,222,136 | 12/1965 | Hess et al. | 261/DIG. 54 |
| 3,349,546 | 10/1967 | Rogers | 261/DIG. 54 |
| 3,385,030 | 5/1968 | Letvin | 55/90 |
| 3,386,712 | 6/1968 | Pafla | 261/DIG. 54 |
| 3,442,611 | 5/1969 | Allgood et al. | 261/DIG. 54 |
| 3,490,204 | 1/1970 | Kalika | 261/DIG. 54 |
| 3,567,194 | 3/1971 | Shah et al. | 261/118 X |
| 3,582,050 | 6/1971 | Kozak | 261/118 |
| 3,812,656 | 5/1974 | Barnhart | 261/116 X |
| 3,841,061 | 10/1974 | Pike | 261/DIG. 54 |
| 3,852,408 | 12/1974 | Ewan et al. | 423/242 |
| 3,852,409 | 12/1974 | Martin et al. | 423/242 |
| 3,894,851 | 7/1975 | Gorman | 261/118 X |
| 4,141,701 | 2/1979 | Ewan et al. | 261/DIG. 54 |

FOREIGN PATENT DOCUMENTS

| | | |
|---|---|---|
| 280088 | 9/1913 | Fed. Rep. of Germany . |
| 881437 | 11/1961 | United Kingdom ....... 261/DIG. 54 |
| 1227499 | 4/1971 | United Kingdom . |

OTHER PUBLICATIONS

Harris et al., "The Ejector Venturi Scrubber", *Chemical Engineering Progress*, vol. 60, No. 5, pp. 100-103 (1964).

Primary Examiner—Richard L. Chiesa
Attorney, Agent, or Firm—Burns, Doane, Swecker & Mathis

[57] ABSTRACT

A process for operating a jet scrubber includes inducing gas to flow through a venturi by spraying coarse liquid droplets into the venturi inlet. The liquid is sprayed at the minimum rate needed to pump the gas. Additional liquid is atomized into fine droplets and introduced into the venturi throat. The ratio of combined liquid flow rates to the gas flow rate is substantially greater than the ratio of the minimum liquid flow rate to the gas flow rate. Hydrogen sulfide gas can be cleaned from a gas stream using a Stretford liquid according to the process.

18 Claims, 2 Drawing Sheets

JET SCRUBBER AND METHOD OF OPERATION

BACKGROUND OF THE INVENTION

The present invention relates generally to a gas liquid contacting method using a jet venturi scrubber and to apparatus for practicing that method. More particularly, the present invention concerns both an improved gas liquid contacting step by which a scrubbing liquid contacts a low-pressure gas containing pollutants and the apparatus for effecting that gas liquid contact.

The jet scrubber is well suited for use in connection with treatment of low-pressure tail gases since it is capable of handling very large mass flow rates of gas and, at the same time, it does not introduce a large pressure loss in the gas flow. In addition, the liquid can be used to entrain the gas into the liquid and through the venturi at the desired rate. In a jet scrubber, the mass flow rate of liquid is sprayed toward a venturi throat to induce gas flow therethrough. The jet scrubber is thus contrasted to a venturi scrubber which uses an external pump or fan to move gas through its venturi throat. Generally, the gas velocity through the throat of a jet scrubber is relatively low, on the order of 50–60 feet per second.

Jet scrubbers are, of course, known in the art. Oftentimes, however, both a liquid and a gas are injected into the venturi throat in order to pump the secondary flow through the scrubber. In one such device, a nozzle is provided which injects a spray axially toward the throat of the venturi and simultaneously ejects a radially directed generally planar flow across the inlet to the venturi throat so as to create two-staged gas liquid contacting. See, for example, British Patent No. 881,437, published Nov. 1, 1961.

Venturi scrubbers are also known for gas liquid contacting. Conventional venturi scrubbers employ an external mechanical energy source such as a fan to force the gas flow through the venturi itself. Typically, the scrubbing liquid is introduced into the venturi throat in jet-like streams which are atomized by the gas passing through the throat at a relatively high velocity, for example, 200–300 feet per second. These venturi scrubbers have a comparatively high pressure loss when compared with jet scrubbers and, generally speaking, are not desirable for treatment of low-pressure gas streams since additional equipment is necessary.

In any scrubber, it is desirable to obtain a uniform distribution of liquid droplets in the gas flow in order to get uniform gas liquid contacting. In conventional jet scrubbers, it has been observed that a significant radial maldistribution of liquid droplets occurs in the outlet from the venturi throat. This maldistribution manifests itself as a high concentration of liquid in the annular region adjacent to the venturi wall and a low concentration of liquid droplets in the center part of the venturi outlet. Further increases in the liquid mass flow rate are counterproductive in terms of alleviating this observed phenomenon.

These malditribution problems are even further exacerbated when the venturi is scaled up for large processing plants. For example, natural gas processing plants that handle 150,000,000 cubic feet per day of natural gas input are currently under design and construction. In such plants, attempts to scale the jet scrubbers up to throat diameters of 60 inches have demonstrated the impracticality of effecting gas liquid contacting in those scrubbers. The massive maldistribution of the liquid droplets in the jet scrubber outlet causes such insufficient gas liquid contact that the scrubbing effectiveness is materially reduced. For example, it has been observed that reductions in the neighborhood of 75% in the scrubbing efficiency of a jet scrubber can occur when this maldistribution of scrubbing liquid is present.

Accordingly, it will be observed that the need continues to exist for a jet scrubber which is capable of operating at high liquid and gas mass flow rates while retaining its efficacy as a gas liquid scrubber.

SUMMARY OF THE INVENTION

To improve the performance of jet scrubbers, the spray nozzle upstream of the venturi throat is supplied with liquid at the minimum mass flow rate required to effect momentum transfer with the gas to be scrubbed. This "pumping" liquid is introduced into the venturi as a coarse spray having large droplets that promote momentum transfer. The remaining portion of the liquid is introduced directly into the venturi throat by an atomizing spray which directs liquid radially toward the core of the Venturi throat. This atomizing spray concentrates scrubbing liquid not required for pumping in the core region of the multiphase flow through the jet scrubber. Simultaneously, the fine droplets resulting from the atomizing spray maximize the surface area of liquid which is exposed to the gas phase. Accordingly, the scrubbing liquid is introduced into the jet scrubber in two distinctly different forms, each form being tailored to enhance its function. More particularly, the pumping spray is introduced as a coarse liquid to maximize the momentum transfer effects and pump the gas through the jet scrubber; whereas the remaining liquid is atomized into the throat of the Venturi so that it will be concentrated in the core regions of the multiphase flow. The foregoing process improves the radial distribution of scrubbing liquid in the downstream portions of the jet scrubber.

As an additional side benefit, it appears that the atomized liquid introduced into the venturi throat imparts a radially inwardly directed momentum component to the downcoming liquid from the momentum transfer stage of the jet scrubber. This further enhances the gas scrubbing capability of the scrubber.

To minimize the possibility that liquid introduced as an atomized flow into the throat may adversely affect the operation of the jet scrubber, liquid introduced in the throat is preferably sprayed through fan-spray-type or flat-cone nozzles, or combinations thereof. In this fashion, momentum of liquid introduced into the throat is not directed upstream which might interfere with gas pumping induced by the liquid jet. Moreover, the flow of contaminated gas and driving liquid carry the atomized liquid downstream in a turbulent flow which enhances mixing.

The apparatus for effecting this advantageous scrubbing technique includes a venturi channel having a pumping nozzle or means for introducing a liquid spray into the inlet. In addition, a plurality of atomizing nozzles are preferably arranged circumferentially around the throat of the channel for introducing that portion of the liquid flow that is not necessary to pump the gas through the jet scrubber. A valve is provided to assure that sufficient liquid mass flow is available to the pumping nozzle to induce gas flow.

Where the atomizing nozzles are arranged circumferentially around the throat, the individual atomizing nozzles are generally equiangularly spaced and have a fan spray angle, spray distance and spray coverage so as to cover substantially the entire area in the plane of the throat with atomized liquid without impingement of sprays from adjacent or opposing nozzles. In this fashion, atomized liquid is being delivered to the radial core of the multiphase flow through the venturi.

BRIEF DESCRIPTION OF THE DRAWINGS

Many objects and advantages of the present invention will be apparent to those skilled in the art when this specification is read in conjunction with the attached drawings wherein like reference numerals have been applied to like elements and wherein.

DESCRIPTION OF THE PREFERRED EMBODIMENTS

Figure 1:
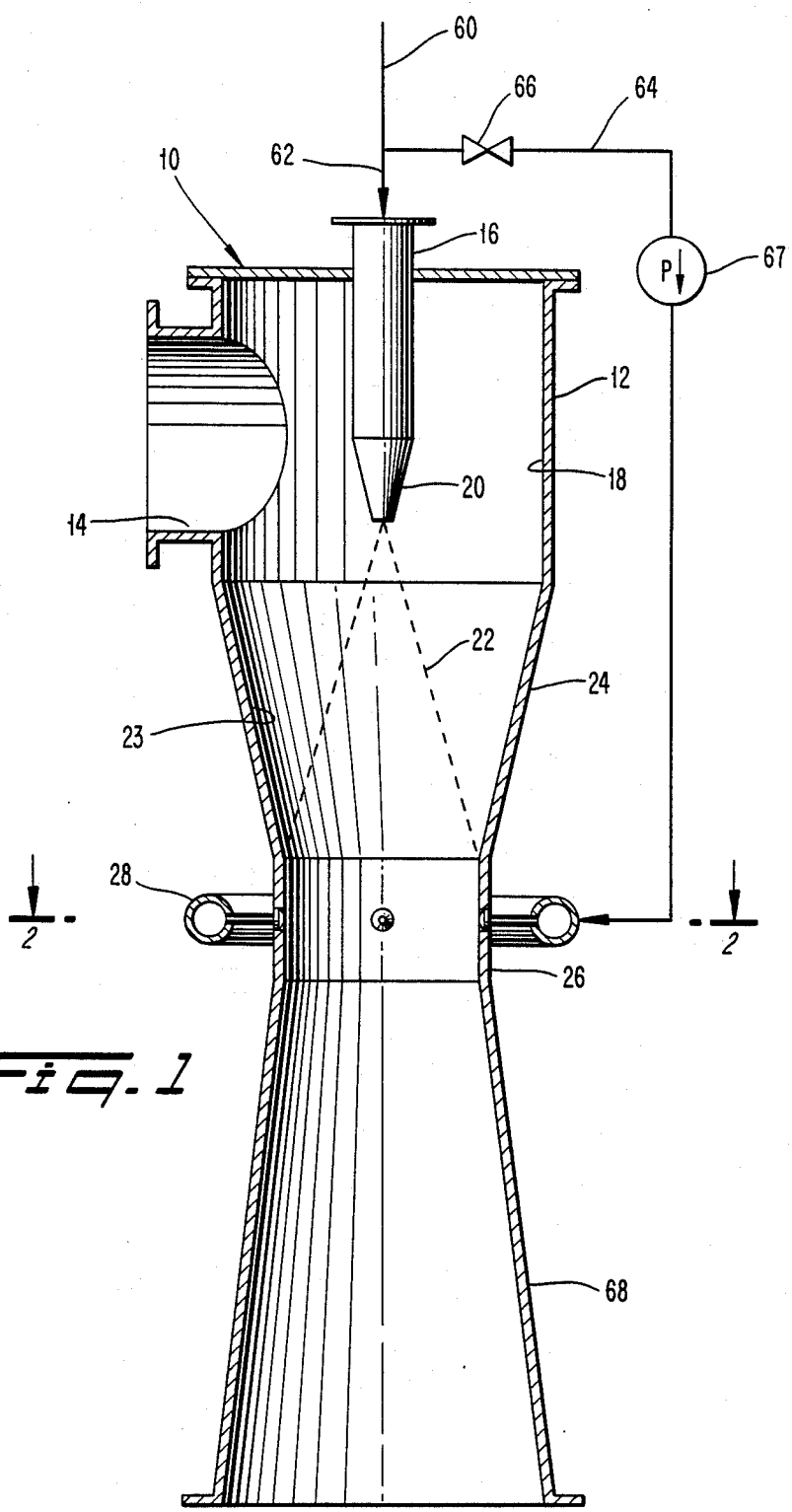
FIG. 1 is a partial cross-sectional view taken through a jet scrubber in accordance with the present invention.

Turning now to FIG. 1, a jet scrubber 10 is illustrated which includes a plenum 12. The plenum 12 may be essentially symmetric about an axis and includes an inlet connection 14 sized for receiving a predetermined mass flow rate of gas that may be contaminated by a pollutant such as hydrogen sulfide. A liquid supply conduit 16 extends into a central portion of the plenum 12 and is coaxial with the axis of the jet scrubber 10. The plenum 12 preferably includes a cylindrical external wall 18. Accordingly, the liquid supply conduit 16 is preferably coaxially aligned with the axis of that cylindrical wall 18.

At the free end of the conduit 16, a suitable conventional spray nozzle 20 is provided. This spray nozzle 20 converts the flow of liquid passing through the conduit 16 into a conical spray 22 which is directed toward the downstream portions of the jet scrubber 10. More particularly, the conical spray 22 from the nozzle 20 is directed through a converging section 24 of the jet scrubber 10 and toward the throat section 26 thereof. A hollow conical spray 22 is preferred to a solid conical spray since the hollow conical spray requires less liquid mass flow to effect the gas pumping desired.

The spray nozzle 20 is positioned relative to the throat section 26 such that the conical spray 22 emitted by the spray nozzle 20 extends into contact with the side walls of the jet scrubber flow channel 23 just upstream of the throat section 26. In this manner, the conical spray 22 emitted from the spray nozzle 20 completely and uniformly envelopes the cross-sectional area of the jet scrubber throat section 26 through which the incoming contaminated gas and scrubbing liquid must pass. Another important feature of the spray nozzle 20 is that the conical spray created by that nozzle is characterized by relatively coarse liquid droplets [e.g., characteristic dimension of average droplet being in the range of 300 to 800 microns] to provide optimum momentum transfer from the liquid to the contaminated gas. Such momentum transfer is the mechanism by which the contaminated gas is entrained into the scrubbing liquid and induced to flow through the jet scrubber 10.

Turning now to the inlet portion 24, it will be seen from FIG. 1 that the inlet preferably comprises a generally frustoconical wall section that converges from a first large diameter at the bottom of the plenum wall 18 to a second smaller diameter at the throat section 26.

Moreover, the inlet section 24 is integrally connected to the plenum 12 in a suitable conventional manner as, for example, by welding in order that gas and liquid be prevented from escaping from the flow channel 23. In a similar manner, the inlet section 24 is integrally connected in a suitable conventional manner to the throat section 26.

The throat section 26 provides the minimum cross-sectional area of the flow channel 23 through which the combined gas and liquid flows must pass. Conventionally, the throat section 26 has a diameter of up to 24-26 inches and the velocity of gas passing through the throat section 26 is below 100 feet per second as can be effectively induced with a liquid pumping flow.

Figure 2:
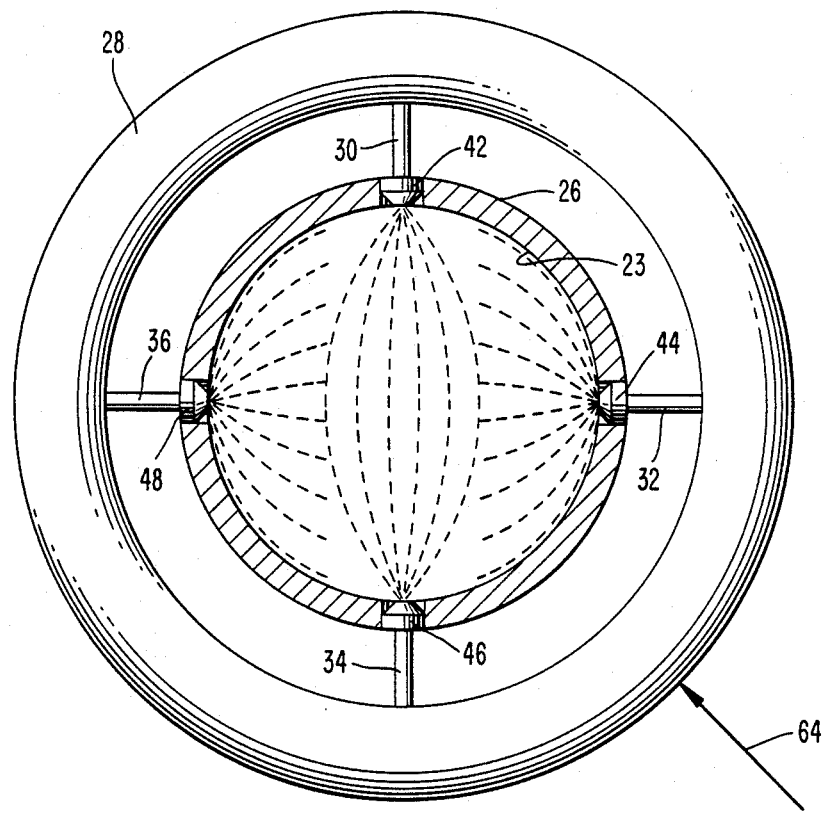
FIG. 2 is an enlarged cross-sectional view taken along the line 2—2 of FIG. 1 with an enlarged scale.

It will also be observed (FIG. 1) that a manifold 28 essentially circumscribes the exterior of the throat section 26. As shown more clearly in FIG. 2, the manifold 28 is connected to the throat section 26 by several branch or spur conduits 30, 32, 34, 36. Each of these branch conduits 30, 32, 34, 36 extends generally radially from the manifold 28 to the wall of the throat section 26. In addition, each of the branch conduits 30, 32, 34, 36 communicates with a corresponding atomizing nozzle 42, 44, 46, 48. Liquid is supplied to the manifold 28 by a conduit 64. In some applications, it may be desireable to provide a pump 67 to further pressurize liquid being delivered to the manifold 28. The manifold 28 then distributes the liquid to the atomizing nozzles 42, 44, 46, 48. While the manifold 28 illustrated extends entirely around the throat section 26, some applications may use a manifold that does not extend continuously around the throat section 26 or may not have such manifold at all, i.e, feed each nozzle by a separte conduit.

Each of the atomizing nozzles 42, 44, 46, 48, is mounted to be flush with the surface of the flow channel 23 in the throat section 26. In this manner the atomizing nozzles do not interfere with fluid flow through the throat section 26. In addition, the atomizing nozzles 42, 44, 46, 48 are selected in accordance with the desired atomizing flow characteristics for which they are used. More particularly, the combination of atomizing nozzles 42, 44, 46, 48 is selected to provide fan sprays with spray angles, spray distances, and spray coverages such as to cover the entire throat area without impingement of sprays from adjacent or opposing nozzles. With such an arrangement, the cross-sectional area of the throat section 26 is essentially covered by the atomized spray with minimum coalescence of drops. For example (FIG. 2), the spray nozzles 42, 46 have the same spray angle, spray distance and spray coverage. Their sprays project to the center of the throat. Spray nozzles 44, 48 have a wider spray angle, a wider coverage, and a shorter spray distance. Their sprays project to the outer periphery of the sprays from the nozzles 42, 46 and their coverage extends almost to the throat diameter.

Each atomizing nozzle 42, 44, 46, 48 preferably provides a fan or flat-cone spray pattern as opposed to a conical spray pattern. This fan spray pattern is desired since it places the atomized liquid directly into the fluid passing through the throat section 26 and does not create any upstream momentum components that might impede the pumping. The atomizing nozzles 42, 44, 46, 48 are preferably selected to provide the smallest liquid particles practical [e.g., characteristic dimension of average particle being no greater than the characteristic dimension of the relatively coarse liquid droplets injected through the spray nozzle 20] to maximize the surface area of liquid exposed to the gas passing through the jet scrubber. Since efficiency of gas scrubbing is a strong function of liquid gas surface area, the atomized droplets facilitate enhancement of the scrubbing function.

Figure 3:
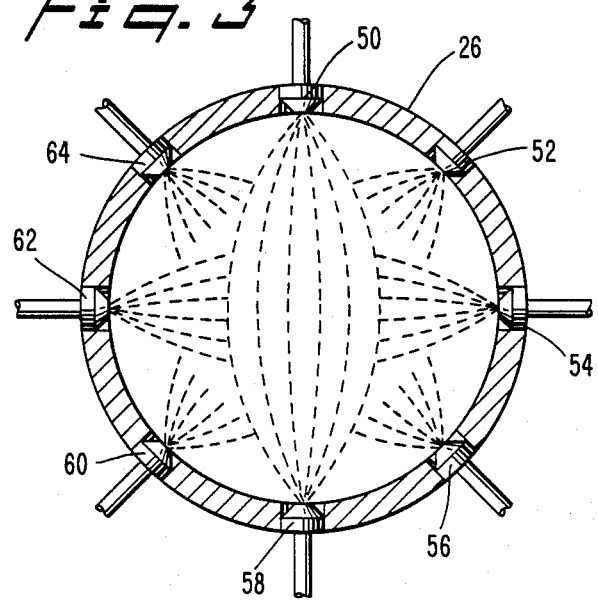
FIG. 3 is a schematic view of another throat and atomizing nozzle configuration.

An alternate embodiment of the nozzle arrangement around the throat is illustrated in FIG. 3. For example, in FIG. 3, eight atomizing nozzles 50, 52, 54, 56, 58, 60, 62, 64 are equiangularly spaced around the circumference of the throat section 26. Each of the atomizing nozzles or each pair of opposing nozzles in the embodiment of FIG. 3 has characteristics similar to those of nozzles 42, 44, 46, 48 discussed above in connection with FIG. 2. It will be appreciated that where light nozzles around the throat section 26 are considered, two groups of four nozzles (see FIG. 2) can be staggered at two different elevations in the throat section 26. The two 4-nozzle layouts should preferably be rotated 90° with respect to each other.

Downstream of the throat section 26 (FIG. 1) is a diffuser or exhaust section 68. The diffuser section is integrally connected to the downstream end of the throat section 26 in a fluid tight manner so that no fluid escapes from the flow channel 23. Preferably, the diffuser section 68 is a frustoconical wall with an inlet diameter corresponding to the throat section diameter and an exit diameter generally corresponding to the diameter at the entrance to the inlet section 24. The diffuser section 68 has an axial length which exceeds the axial length of the inlet section 24 so that fluid passing through the flow channel 23 and the diffuser section 68 is gradually decelerated.

In operation, the inlet connection 14 of the plenum 12 is connected in fluid communication with a source of gas to be scrubbed. The scrubbing may be desired for removal of hydrogen sulfide, sulfur dioxide, nitrous oxides, dust, and/or other gaseous or particulate pollutants. Moreover, the pollutant removal may be effected by simple contact or by chemical interaction. In suitable applications, the inlet connection 14 may be in communication with the effluent gas stream either from a petroleum refinery, chemical plant or a natural gas desulfurization plant.

A specific process for which the jet scrubber of this invention is well suited is the Stretford process, a well known petroleum industry process for effecting hydrogen sulfide removal. The Stretford process is generally described in three U.S. patents issued to T. Nicklin et al, U.S. Pat. No. 2,997,439 issued Aug. 21, 1961; U.S. Pat. No. 3,035,889, issued May 22, 1962; and U.S. Pat. No. 3,097,926, issued July 16, 1963.

A first predetermined mass or volumetric flow of liquid, i.e. a single phase liquid, is introduced into the jet scrubber 10 and simultaneously sprayed from the nozzle 20 at the end of the conduit 16. This liquid provides two functions: it provides a motive force to induce gas to flow through the inlet connection 14 and through the jet scrubber 10; and it also provides an initial contact with the gas for scrubbing purposes by entraining the gas into the liquid. For example, where the jet scrubber 10 is used in connection with a Stretford process, a portion of the Stretford solution is sprayed from the conduit 60. Within the scrubber 10, that portion of the Stretford solution drives the gas through the scrubber and contacts the hydrogen-sulfide-laden gas entering through the inlet connection 14. During the gas-liquid contact the Stretford solution reacts with the hydrogen sulfide gas to produce elemental sulfur, a solid. As a result, after initial contact, a three phase flow regime exists: the gas, the Stretford liquid and the sulfur particles.

In addition to the foregoing first predetermined liquid flow rate, a second predetermined liquid flow rate is injected into the jet scrubber 10. This second liquid flow rate is atomized by the atomizing nozzles 42, 44, 46, 48 (FIG. 2) and is discharged as additional liquid phase into the multiphase flow passing through the throat section 26. This atomized liquid has fine droplets which have a specific surface area that is quite large in comparison to the droplets sprayed by the nozzle 20. As a result, the atomized liquid substantially increases the gasliquid contact efficiency.

It will also be seen (FIG. 1) that the spray nozzle 20 gives the large liquid droplets a radial velocity component that is directed away from the scrubber centerline or axis and toward the wall. Injection of atomized liquid in the throat section 26 opposes that radial velocity component and moves fine liquid droplets into the flow around the scrubber axis. Recognizing that due to the classical transverse velocity profile which develops in the scrubber a larger percentage of the gas flow rate passes through the center of the scrubber than passes through the annular region adjacent to the wall, the injection of atomized liquid into the central portion of the scrubber flow stream places the atomized liquid with its high surface area in that part of the flow system which has the highest gas flow rate. As a result of these various factors, a considerably enhanced efficiency of gas liquid contact and of contaminant removal are attained.

The total liquid mass flow rate (i.e. the sum of the first and second predetermined liquid flow rates) used for driving the scrubber and for contacting the contaminant-laden gas is selected such that the total liquid mass flow rate substantially exceeds the minimum liquid mass flow rate required to effect jet pumping. More specifically, the mass flow of liquid introduced through the conduit 60 (FIG. 1) exceeds the minimum liquid mass flow rate required for pumping by 25% or more.

It has been found that the minimum liquid mass flow rate required to pump a predetermined gas mass flow rate can be expressed by the following theoretical expression, proven by test and operational data:

$$\dot{m}_{l\,min.} = \frac{1 + (\rho_{l,t}/\rho_{g,t})}{(A_t/A_n) - 1} \dot{m}_g$$

In the foregoing equation, $\dot{m}_{l\,min.}$ is the minimum liquid mass flow rate; $\dot{m}_g$ is the gas mass flow rate; $\rho_{l,t}$ is the liquid density at the venturi throat; $\rho_{g,t}$ is the gas density at the venturi throat; $A_t$ is the cross-sectional area of the throat; and $A_n$ is the cross-sectional area of the nozzle exit. This equation is for the normal situation where the jet from nozzle 20 terminates at the throat, (FIG. 1). When the jet terminates upstream of the throat, the cross-sectional area of channel 23 at the point of jet termination should be used in the above equation instead of $A_t$.

The total liquid-mass-flow-rate introduced through the conduit 60 is divided between the conduit 62 and the conduit 64 by appropriate adjustment of a suitable conventional valve 66. The valve 66 is adjusted such that the conduit 62 receives that first predetermined portion of the total liquid mass flow rate required to pump the gas mass flow rate entering through the inlet connection 14. Accordingly, the driving portion of the liquid mass flow rate passes from conduit 62 through conduit 16 and is exhausted through the spray nozzle 20 as described above.

The difference between the total liquid-mass-flow-rate and the first predetermined liquid-mass-flow-rate comprises the second predetermined liquid-mass-flow-rate which communicates through the conduit 64 with the manifold 28. This second predetermined liquid-mass-flow-rate may be pressurized by the suitable conventional pump 67 as necessary for the atomizing nozzles. From the manifold 28, the second portion of the total liquid mass flow rate is atomized and discharged radially inwardly toward the center of the throat section 26 by the atomizing nozzles 42, 44, 46, 48 (see FIG. 2).

Injection of finely atomized liquid droplets toward the centerline of the jet scrubber 10 (FIG. 1) is highly advantageous. More particularly, it has been observed that large jet scrubbers with high liquid-to-gas mass flow ratios, but not having atomization nozzles in the throat, experience a severe maldistribution of liquid droplets at the exit from the diffuser section 68. More particularly, it has been observed that the liquid is concentrated in the wall regions of the scrubber at the diffuser exit. This maldistribution of liquid contributes to a very poor gas liquid contacting process in the scrubber itself. For example, when working with hydrogen sulfide in a Stretford process, it has been observed that gas flow at the scrubber exit has as much as four times the hydrogen sulfide content as would be expected for the liquid-to-gas flow ratio.

This much higher concentration of pollutant gases is at least partially explained by the fact that the largest volumetric gas flow through the scrubber occurs around the axis whereas the lowest volumetric gas flow occurs in the annular region adjacent the scrubber wall. Accordingly, the larqest volume of gas passes through the area having the least liquid droplets.

In accordance with the present invention, however, when the second portion of the Stretford solution is introduced through the atomizing nozzles 42, 44, 46, 48 (FIG. 2) in the throat section 26, fine liquid droplets are introduced directly into the central portion of the gas stream. Moreover, the liquid droplets are concentrated at the centerline and in the central regions of the flow region where the highest volume of gas passes. Still further, the liquid introduced in the throat is introduced in the most finely atomized droplets possible so as to materially increase the surface area available for the gas liquid contact. And, the atomized sprays in the throat tend to provide a radially inwardly directed momentum component which thereby displaces some of the first portion of the liquid toward the central portions of the scrubber. As a result of the foregoing, materially enhanced gas liquid contacting is obtained from a scrubber constructed in the fashion described above.

It will now be apparent that in accordance with the present invention, an improved jet scrubber has been described and an improved method of gas liquid contacting has been disclosed. Thus, it will be apparent to those skilled in the art that numerous modifications, variations, substitutions and equivalents exist for features of the apparatus and method described herein. Accordingly, it is expressly intended that all such modifications, variations, substitutions and equivalents that exist for features of the apparatus and method which fall within the spirit and scope of the appended claims be embraced thereby.

What is claimed is:

1. A method of operating a liquid-driven jet scrubber having an axial inlet and throat comprising the steps of:
    introducing gas to the inlet at a predetermined mass flow rate;
    inducing the gas to flow through the throat by spraying liquid into the inlet at a first predetermined liquid mass flow rate, the first predetermined liquid mass flow rate being essentially the minimum liquid mass flow rate that will pump the predetermined gas mass flow rate through the scrubber; and
    atomizing additional liquid at a second predetermined liquid mass flow rate essentially radially into the throat to create a radially inwardly directed velocity component, the ratio of the sum of the first and second predetermined liquid mass flow rates to the predetermined gas mass flow rate being substantially greater than the ratio of the first predetermined liquid mass flow rate to the predetermined gas mass flow rate.

2. The method of claim 1 wherein the atomizing step includes spraying the liquid through planar fan or flat-cone spray nozzles to essentially cover the radial cross section of the throat with atomized liquid.

3. The method of claim 1 wherein the gas inducing step includes spraying the first predetermined liquid flow rate into the inlet through a conical spray nozzle.

4. The method of claim 1 wherein the introducing step includes the step of introducing a gas contaminated with hydrogen sulfide.

5. The method of claim 4 wherein the inducing and atomizing steps introduce a liquid capable of removing large quantities of hydrogen sulfide from the contaminated gas.

6. The method of claim 5 wherein the inducing and atomizing steps introduce a Stretford liquid into the scrubber to remove hydrogen sulfide from the contaminated gas.

7. The method of claim 1 wherein the introducing step includes the step of introducing a gas contaminated by a pollutant.

8. The method of claim 7 wherein the inducing and atomizing steps introduce a liquid capable of removing large quantities of the pollutant from the contaminated gas.

9. A liquid-driven jet scrubber for contacting a gas with a liquid comprising:
    a channel having an inlet and a throat, sized to transmit a predetermined gas mass flow rate, the inlet being exposed to a source of gas to be scrubbed;
    spray means for inducing the predetermined gas mass flow rate through the channel, the spray means injecting a first predetermined liquid flow rate into the inlet which is essentially the minimum required to induce the gas mass flow rate; and
    means for injecting a second predetermined mass flow rate of atomized liquid radially inwardly to the throat to provide a large gas-liquid surface area, the injecting means including a plurality of fan spray atomizing nozzles equiangularly positioned around the throat.

10. The gas scrubber of claim 9 further including means for supplying liquid to the spray means and the injecting means.

11. The gas scrubber of claim 9 with more than one level of atomizing nozzles in the throat section, each level of nozzles having the characteristics of the nozzles of claim 9.

12. A liquid-driven jet scrubber for contacting a gas with a liquid comprising:

a channel having an inlet and a throat, sized to transmit a predetermined gas mass flow rate, the inlet being exposed to a source of gas to be scrubbed;

spray means for inducing the predetermined gas mass flow rate through the channel, the spray means injecting a first predetermined liquid flow rate into the inlet which is essentially the minimum required to induce the gas mass flow rate; and means for injecting a second predetermined mass flow rate of atomized liquid radially inwardly to the throat to provide a large gas-liquid surface area;

wherein the injecting means includes a plurality of fan spray atomizing nozzles mounted flush with the throat, equiangularly positioned around the throat and each nozzle having a spray angle, spray distance, and spray coverage such that the combination of nozzles covers the entire throat area with minimal impingement of sprays from adjacent and from opposed nozzles.

13. A method of operating a jet scrubber having an axial inlet and throat comprising the steps of:

introducing gas to the inlet at a predetermined mass flow rate;

inducing the gas to flow through the throat by spraying liquid into the inlet at a first predetermined liquid mass flow rate, the first predetermined liquid mass flow rate being essentially the minimum liquid mass flow rate that will pump the predetermined gas mass flow rate through the scrubber; and atomizing additional liquid at a second predetermined liquid mass flow rate essentially radially into the throat to create a radially inwardly directed velocity component, the ratio of the sum of the first and second predetermined liquid mass flow rates to the predetermined gas mass fow rate being substantially greater than the ratio of the first predetermined liquid mass flow rate to the predetermined gas mass flow rate;

including selecting the minimum liquid mass flow rate that will pump the predetermined gas flow rate according to the relationship $$\dot{m}_l = \frac{1 + (\rho_{l,t}/\rho_{g,t})}{(A_t/A_n) - 1} m_g$$

where $\dot{m}_l$ is the minimum liquid mass flow rate, $m_g$ is the predetermined gas mass flow rate, $\rho_{l,t}$ is the liquid density at the venturi throat, $\rho_{g,t}$ is the gas density at the venturi throat, $A_t$ is the cross-sectional area of the venturi throat, and $A_n$ is the cross-sectional area of the nozzle exit.

14. The method of claim 13 wherein the atomizing step introduces a liquid mass flow rate that is at least 25% of the first liquid mass flow rate to provide a large liquid-gas surface area and redistribute the first liquid mass flow and the atomized liquid mass flow across the throat.

15. The method of claim 14 wherein the inducing step sprays coarse liquid droplets having an average characteristic dimension in the range of 300 to 800 microns and wherein the atomizing step introduces droplets having an average characteristic dimension smaller than the coarse droplets.

16. A jet scrubber for contacting a gas with a liquid comprising:

a channel having an inlet and a throat, sized to transmit a predetermined gas mass flow rate, the inlet being exposed to a source of gas to be scrubbed;

spray means for inducing the predetermined gas mass flow rate through the channel, the spray means injecting a first predetermined liquid flow rate into the inlet which is essentially the minimum required to induce the gas mass flow rate;

means for injecting a second predetermined mass flow rate of atomized liquid radially inwardly to the throat to provide a large gas-liquid surface area, the injecting means including a plurality of fan spray atomizing nozzles equiangularly positioned around the throat;

wherein the channel has a cross-sectional area at the throat, wherein the spray means includes a nozzle having a cross-sectional area at the exit thereof, wherein the predetermined gas mass flow rate has a density at the throat, wherein the liquid has a density at the throat, and wherein the first predetermined liquid flow rate injected by the spray means is selected according to the following relationship $$\dot{m}_l = \frac{1 + (\rho_{l,t}/\rho_{g,t})}{(A_t/A_n) - 1} m_g$$

where $\dot{m}_l$ is the minimum liquid mass flow rate, $m_g$ is the predetermined gas mass flow rate, $\rho_{l,t}$ is the liquid density at the venturi throat, $\rho_{g,t}$ is the gas density at the venturi throat, $A_t$ is the cross-sectional area of the venturi throat, and $A_n$ is the cross-sectional area of the nozzle exit.

17. The jet scrubber of claim 16 wherein the second predetermined liquid mass flow rate is at least 25% of the first predetermined liquid mass flow rate to provide the large liquid-gas surface area and redistribute the first predetermined liquid flow rate and the second predetermined mass flow rate across the throat.

18. A jet scrubber for contacting a gas with a liquid comprising:

a channel having an inlet and a throat, sized to transmit a predetermined gas mass flow rate, the inlet being exposed to a source of gas to be scrubbed;

spray means for inducing the predetermined gas mass flow rate through the channel, the spray means injecting a first predetermined liquid flow rate into the inlet which is essentially the minimum required to induce the gas mass flow rate;

means for injecting a second predetermined mass flow rate of atomized liquid radially inwardly to the throat to provide a large gas-liquid surface area;

wherein the channel has a cross-sectional area at the throat, wherein the spray means includes a nozzle having a cross-sectional area at the exit thereof, wherein the predetermined gas mass flow rate has a density at the throat, wherein the liquid has a density at the throat, and wherein the first predetermined liquid flow rate injected by the spray means is selected according to the following relationship $$\dot{m}_l = \frac{1 + (\rho_{l,t}/\rho_{g,t})}{(A_t/A_n) - 1} \, m_g$$

where $\dot{m}_l$ is the minimum liquid mass flow rate, $m_g$ is the predetermined gas mass flow rate, $\rho_{l,t}$ is the liquid density at the venturi throat, $\rho_{g,t}$ is the gas density at the venturi throat, $A_t$ is the cross-sectional area of the venturi throat, and $A_n$ is the cross-sectional area of the nozzle exit;

wherein the second predetermined liquid mass flow rate is at least 25% of the first predetermined liquid mass flow rate to provide the large liquid gas surface area and redistribute the first predetermined liquid flow rate and the second predetermined mass flow rate across the throat; and wherein the spray means injects coarse liquid droplets having an average characteristic dimension in the range of 300 to 800 microns and wherein the means for injecting atomized liquid introduces droplets having an average characteristic dimension smaller than the average characteristic dimension of the coarse droplets.

* * * * *